United States Patent
Sun et al.

(10) Patent No.: US 9,513,770 B1
(45) Date of Patent: Dec. 6, 2016

(54) ITEM SELECTION

(71) Applicant: MicroStrategy Incorporated, Vienna, VA (US)

(72) Inventors: Yue Sun, Falls Church, VA (US); Hector Vazquez, Ashburn, VA (US)

(73) Assignee: MicroStrategy Incorporated, Vienna, VA (US)

( * ) Notice: Subject to any disclaimer, the term of this patent is extended or adjusted under 35 U.S.C. 154(b) by 221 days.

(21) Appl. No.: 13/667,025

(22) Filed: Nov. 2, 2012

(51) Int. Cl.
*G06F 3/048* (2013.01)
*G06F 3/00* (2006.01)
*G06F 3/0482* (2013.01)

(52) U.S. Cl.
CPC .................. *G06F 3/0482* (2013.01)

(58) Field of Classification Search
CPC .... G06F 9/1445; H04N 5/44543; G06Q 10/10
USPC ........ 715/716, 835, 810, 276, 751; 345/173; 700/276; 370/230; 709/204; 348/333
See application file for complete search history.

(56) References Cited

U.S. PATENT DOCUMENTS

| | | | | |
|---|---|---|---|---|
| 7,299,257 B2 * | 11/2007 | Boyer et al. | ................. | 709/204 |
| 7,739,604 B1 * | 6/2010 | Lyons et al. | ................. | 715/736 |
| 7,987,429 B2 * | 7/2011 | Hosoya | ......................... | 715/762 |
| 8,130,205 B2 * | 3/2012 | Forstall et al. | ............... | 345/173 |
| 8,149,701 B2 * | 4/2012 | Sumler et al. | ................. | 370/230 |
| 8,453,057 B2 * | 5/2013 | Stallings et al. | ............. | 715/726 |
| 8,554,374 B2 * | 10/2013 | Lunacek et al. | ............. | 700/276 |
| 8,701,030 B2 * | 4/2014 | Lyons et al. | ................. | 715/769 |
| 8,762,870 B2 * | 6/2014 | Robotham et al. | ........... | 715/769 |
| 2003/0167447 A1 * | 9/2003 | Hatta | ................. | H04N 1/00132 715/243 |
| 2006/0136845 A1 * | 6/2006 | Rimas-Ribikauskas | | G06F 3/04812 715/862 |
| 2006/0224938 A1 * | 10/2006 | Fikes | ................. | G06F 17/30876 715/234 |
| 2007/0035652 A1 * | 2/2007 | Toyoda | ................. | G11B 27/105 348/333.05 |
| 2007/0234227 A1 * | 10/2007 | Prinsen | ................. | G06F 3/0486 715/769 |
| 2009/0070675 A1 * | 3/2009 | Li | ................................ | 715/716 |
| 2009/0177546 A1 * | 7/2009 | Dijk et al. | ...................... | 705/14 |
| 2009/0183076 A1 * | 7/2009 | Shim et al. | ................... | 715/716 |
| 2010/0107104 A1 * | 4/2010 | Bruce | ............... | G06F 17/30174 715/772 |

(Continued)

OTHER PUBLICATIONS

"Wikihow about how to move mail to different folders in Gmail", dated Aug. 17, 2011.*

*Primary Examiner* — Li Sun
*Assistant Examiner* — Jasmine Wan
(74) *Attorney, Agent, or Firm* — Fish & Richardson P.C.

(57) ABSTRACT

A computing device obtains data representing a plurality of items. A viewport is rendered on a display of the computing device. A portion of a first container element and a portion of a second container element are rendered within the viewport. Selectable visual representations for a first subset of the plurality of items are rendered in the portion of the first container element. The computing device receives a plurality of inputs from the user, each of the plurality of inputs selecting a visual representation of an item from the plurality of items rendered in the first container element. Responsive to receiving each input from the user, another visual representation of each selected item is rendered in the second container element, indicating that the selected item has been selected.

18 Claims, 9 Drawing Sheets

(56) References Cited

U.S. PATENT DOCUMENTS

| | | | |
|---|---|---|---|
| 2010/0235776 A1* | 9/2010 | Brown | 715/772 |
| 2011/0004830 A1* | 1/2011 | Von Kaenel | G06F 17/30241 |
| | | | 715/751 |
| 2012/0030566 A1* | 2/2012 | Victor | 715/702 |
| 2012/0185800 A1* | 7/2012 | Hart et al. | 715/810 |
| 2013/0290848 A1* | 10/2013 | Billings | H04L 51/32 |
| | | | 715/719 |

* cited by examiner

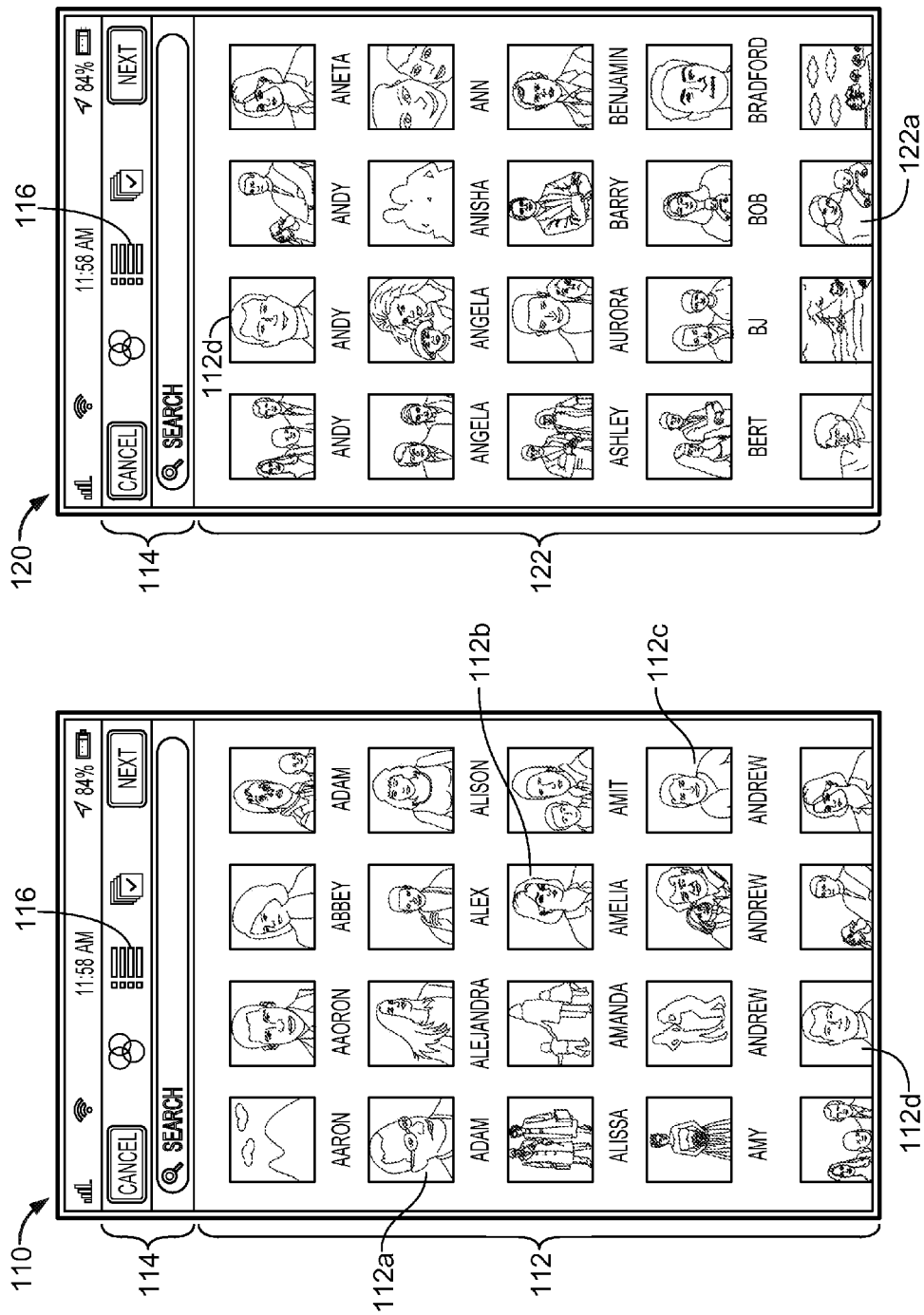

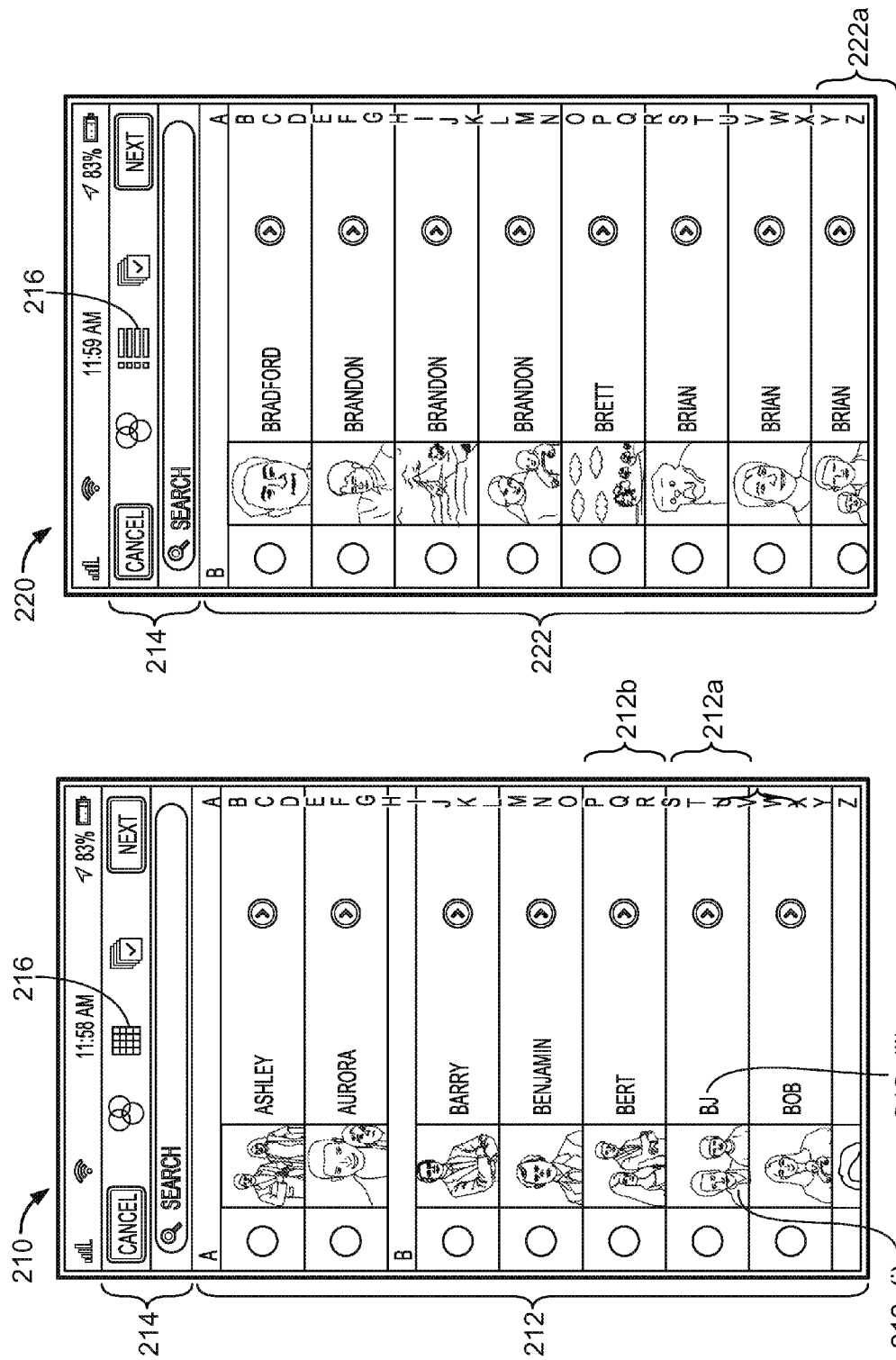

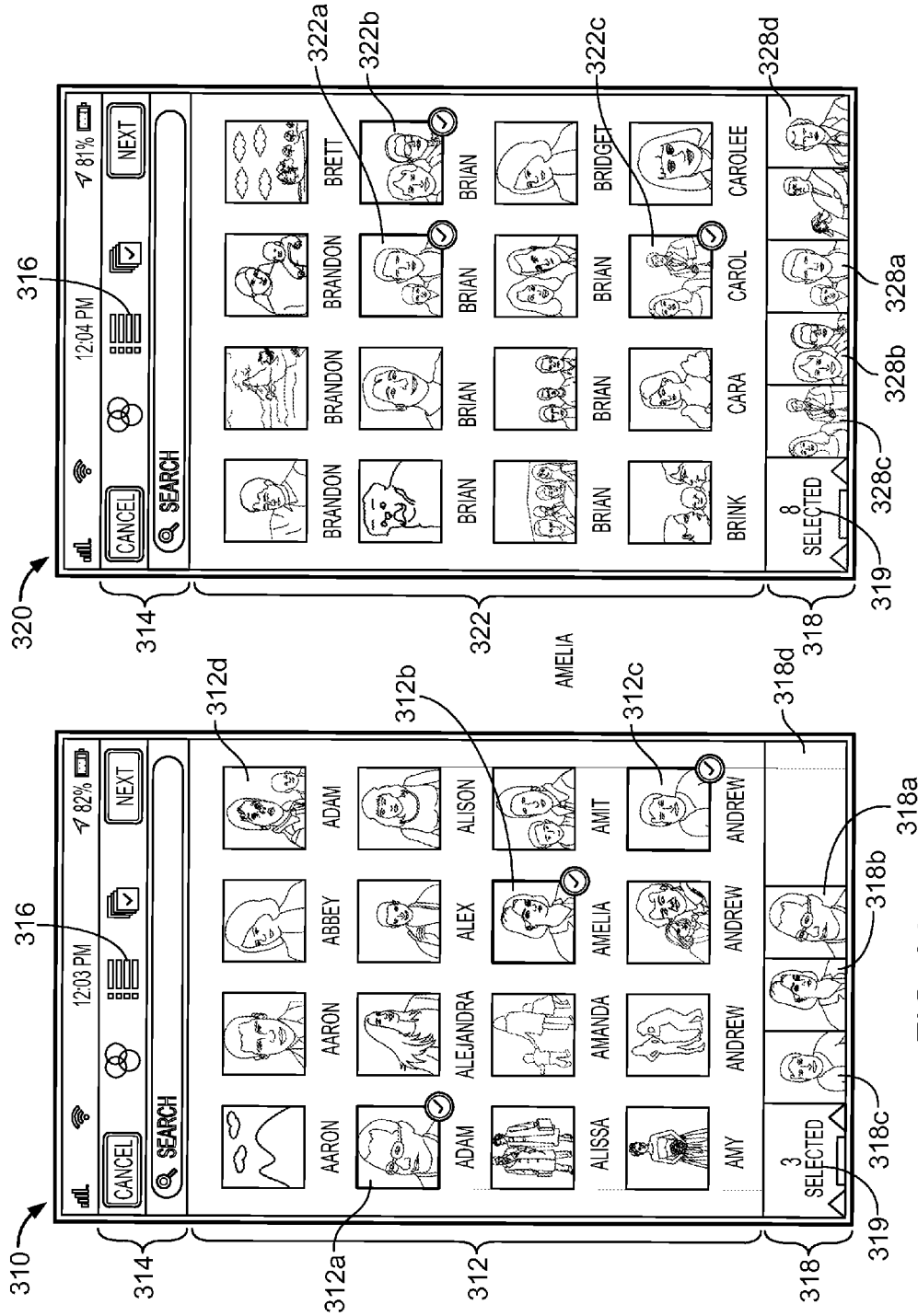

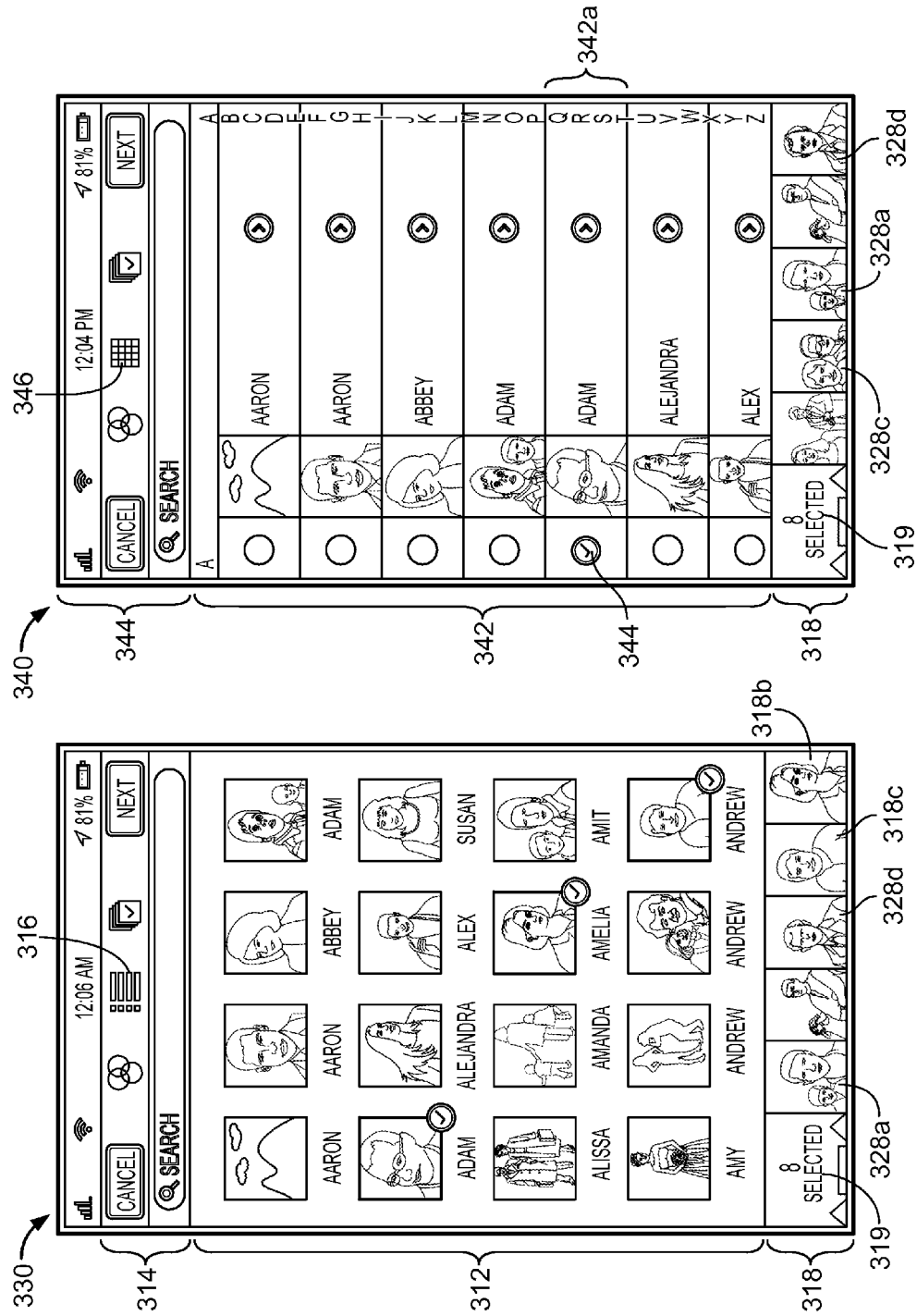

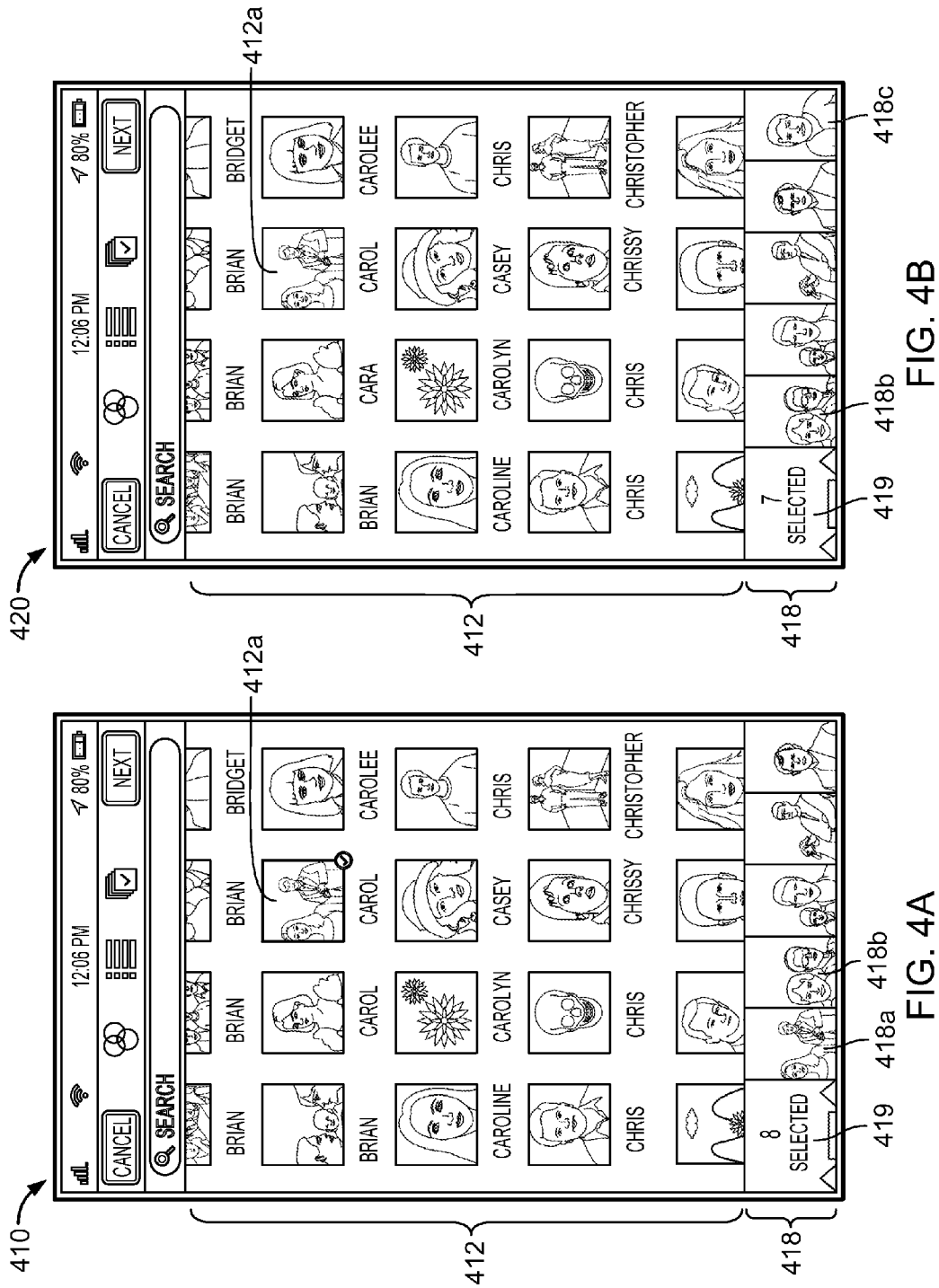

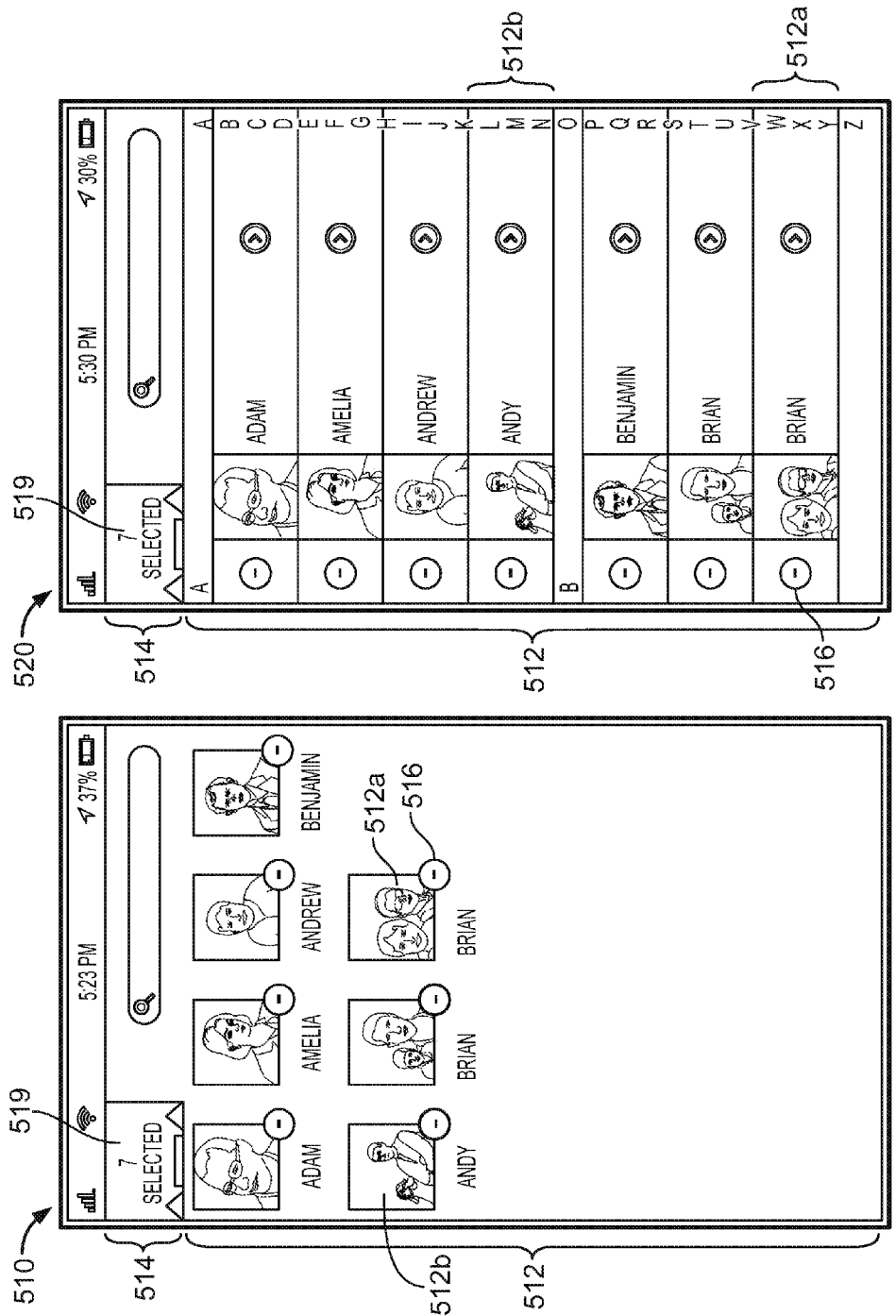

ITEM SELECTION

TECHNICAL FIELD

This disclosure generally relates to item selection.

BACKGROUND

Some electronic devices, such as computers and smartphones, include a display on which information is presented to a user. Sometimes a graphical user interface (GUI) is used to present the information.

SUMMARY

In a general aspect, a computing device obtains data representing a plurality of items. A viewport is rendered on a display of the computing device. A portion of a first container element and a portion of a second container element are rendered within the viewport. The first container element extends beyond a first boundary of the viewport in a first direction, and the second container element extends beyond a second boundary of the viewport in a second direction. The first direction is perpendicular to the second direction.

Selectable visual representations for a first subset of the plurality of items are rendered in the portion of the first container element. The first container element includes a first command interface that enables a user to manipulate the first container element along the first direction such that other portions of the first container element beyond the first boundary are rendered within the viewport, so as to display selectable visual representations for other subsets of the plurality of items.

The computing device receives a plurality of inputs from the user, each of the plurality of inputs selecting a visual representation of an item from the plurality of items rendered in the first container element. Responsive to receiving each input from the user, another visual representation of each selected item is rendered in the second container element, indicating that the selected item has been selected. At least one of the selected items is within a portion of the second container element that is beyond the second boundary of the viewport. The second container element includes a second command interface that enables a user to manipulate the second container element along the second direction such that the portion of the second container element that is beyond the second boundary is moved within the viewport, so as to display the at least one of the selected items that is beyond the second boundary of the viewport.

Implementations may include one or more of the following. The plurality of items may be a plurality of individuals to whom a message is to be sent. The visual representations of the items may be photographs of the individuals that the visual representations represent. The visual representations of the items may be photographs supplied by the individuals that the visual representations represent.

The plurality of items may be a plurality of files available for download. The plurality of items may be a plurality of products available for purchase. A first dimension and a second dimension of the viewport may be fixed. An area of the first container element may be fixed. The second container element may overlay the first container element. The second container element may be a scrollable list.

The visual representations of the selected items rendered in the second container element may be smaller in size than the selectable visual representations rendered in the first container element. The visual representations of the items rendered in the first container element may comprise images and text. The visual representations of the items rendered in the second container may include images while excluding text.

The visual representations of the items rendered in the first container element may be displayed in a grid view. The first container element may comprise a third command interface that enables the user to cause the visual representations of the items rendered in the first container element to be rendered in a list view.

The display may be a touch-sensitive display. Receiving, at the computing device, a plurality of inputs from the user, each of the plurality of inputs selecting a visual representation of an item from the plurality of items rendered in the first container element may comprise receiving, at the computing device, a plurality of touches on the touch-sensitive display, each of the plurality of touches selecting a visual representation of an item from the plurality of items rendered in the first container element. The operations may comprise receiving, at the computing device, a drag gesture on the touch-sensitive display selecting a previously selected item rendered in the second container element such that the previously selected item is deselected. A visual representation of the previously selected item may be removed from the second container element.

Visual representations of selected items rendered in the first container element may be visually distinguished from visual representations of non-selected items rendered in the first container element. The operations may comprise rendering, adjacent to the second container element, a representation of a total number of selected items.

Implementations of the above techniques include a method, a computer-readable medium, and a system. The computer-readable medium stores instructions executable by one or more processors. The instructions, when executed, are configured to cause the one or more processors to perform the above described actions. The system includes one or more processors and instructions embedded in a non-transitory machine-readable medium that are executable by the one or more processors. The instructions, when executed, are configured to cause the one or more processors to perform the above described actions.

The details of one or more implementations are set forth in the accompanying drawings and the description, below. Other potential features and aspects will be apparent from the description and drawings, and from the claims.

BRIEF DESCRIPTION OF THE DRAWINGS

FIGS. 1A, 1B and 1C illustrate three different views of an example of a GUI showing three different subsets of a collection of items.

FIGS. 2A and 2B illustrate two different views of an example of a GUI showing two different subsets of a collection of items in a list arrangement.

FIGS. 3A-3D illustrate four different views of an example of a GUI showing the selection of visual representations of users.

FIGS. 4A and 4B illustrate two different views of an example of a GUI showing the de-selection of a user.

FIGS. 5A and 5B illustrate two different views of an example of a GUI showing visual representations of selected users.

DETAILED DESCRIPTION

Figure 1C:
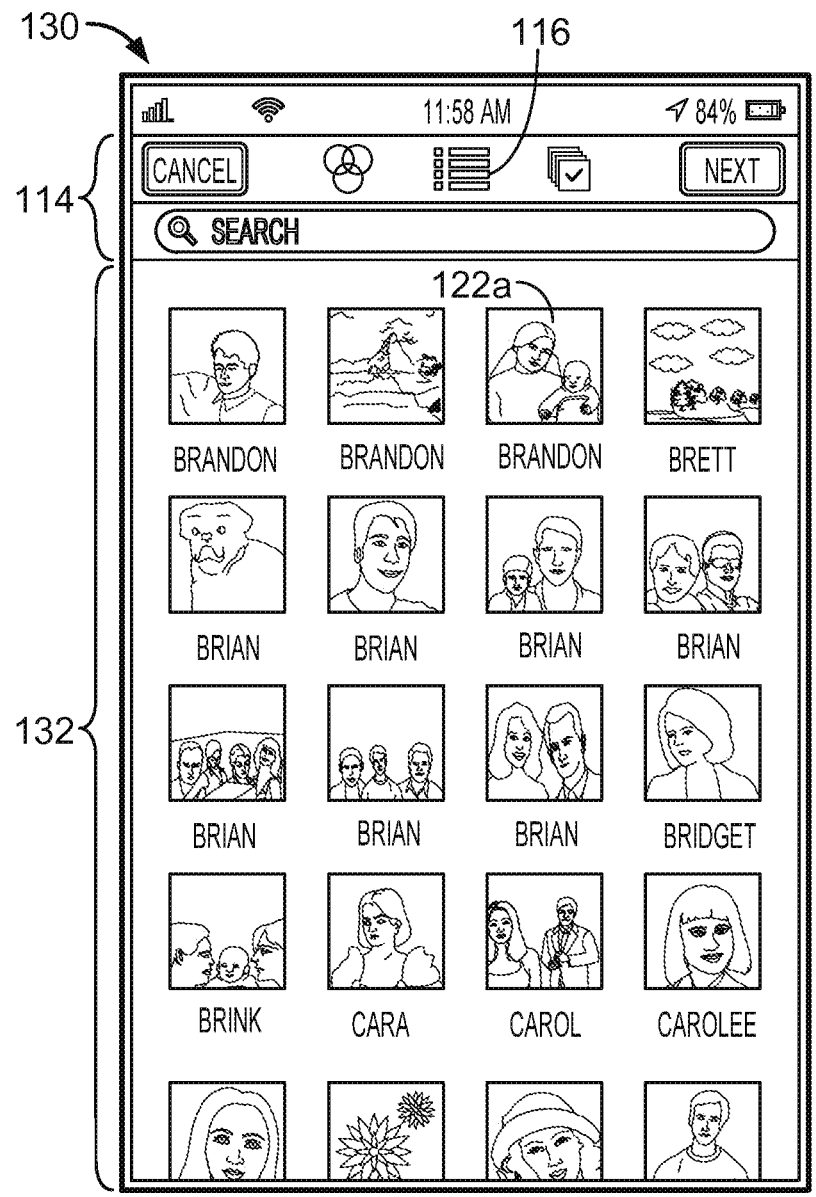

Sometimes a user of an electronic device, such as, for example, a computer or a smartphone, may wish to perform a bulk operation on items shown by the electronic device. For example, the user may pull up an address book application on the electronic device in order to select contacts from the address book to whom to send a group message. The address book of the user may include a large number of entries such that not all entries may be visible to the user at the same time on the limited display area of the electronic device. Therefore, the user may have to scroll through the address book, viewing portions of the address book at a time on the display of the electronic device and selecting contacts from the viewed portions. However, as the address book is scrolled, some of the selected contacts may move out of view. Consequently, the user may not remember all of the contacts that the user has selected. In addition, if the user wants to remove a selected contact, there may not be any convenient way to do so except to scroll back through the address book to the portion of the address book that includes the contact to be removed.

In some implementations, an interface may be provided on a display associated with an electronic device that enables a user to select items from among a collection of a large number of items while simultaneously displaying at least some of the selected items. The items may be, for example, contacts from an address book application. The interface may show several panels simultaneously on the display of the electronic device. In a first panel, the interface may provide a view of visual representations of items from the collection of items. If the number of items in the collection is relatively large, the view of the first panel at any given time only may display visual representations of a subset of less than all of the items in the collection. In a second panel, the interface may provide a view of visual representations of items that have been selected (for example, by a user of the electronic device). The second panel may enable easy identification of the items that have been selected even when the currently displayed view of the first panel does not include visual representations of any of the items that have been selected.

In the discussion that follows, a user operating an electronic device also may be referred to as an operator of the electronic device. In addition, the term interface may refer to a GUI (or a portion of a GUI) that is shown on the display of an electronic device. Furthermore, references to an item and to a visual representation of the item may be used interchangeably.

In some implementations, the display associated with the electronic device may have a limited dimension such that the entire interface may not be visible simultaneously on the display of the electronic device. In such implementations, only a portion of the interface may be viewable on the display at a time. The portion of the interface that is viewable on the display may be referred to as a viewport.

FIGS. 1A, 1B and 1C illustrate three different views 110, 120 and 130 respectively of an example of a GUI showing three different subsets of a collection of items. As shown in the views 110, 120 and 130, and for the purpose of this discussion, the items considered are visual representations of users (for example, contacts in an electronic address book). However, in other implementations, the items may be of some other suitable type, such as visual representations of files available for download, products available for purchase, and so forth. The items also may include combinations of different types of items, such as, for example, visual representations of users, along with visual representations of products that may be purchased for the represented users.

Each of the views 110, 120 and 130 includes a header panel 114 that is fixed across the different views and that includes a selectable icon 116. In addition, each of the views 110, 120 and 130 includes a scrollable selection panel that displays respective subsets 112, 122 and 132 of visual representations of users belonging to the collection of users, including, for example, users 112*a*, 112*b*, 112*c*, 112*d* and 122*a*. The scrollable selection panel also may be referred to as a container element.

The GUI, including views 110, 120 and 130, may be presented on the display of an electronic device. The electronic device may be, for example, a mobile device such as a mobile phone, a smartphone, a tablet computer, a notebook or laptop computer, an e-book reader, a music player, and so forth. Alternatively, the electronic device may be a desktop computer or any other appropriate portable or stationary computing device. The electronic device may include a display, such as a Liquid Crystal Display (LCD) or a Light Emitting Diode (LED) display with a glass screen.

The electronic device may include a processor. The electronic device also may include storage memory, such as, for example, a magnetic disk drive or flash memory, which stores data and instructions. The instructions may be written in any suitable programming language, for example, machine-level code, C, Objective-C, C++, Java, Perl or HTML, among others. The processor may be configured to execute the instructions for performing various operations, such as input/output, communication, data processing, software execution and the like. For example, the processor may execute instructions that provides the GUI with the views 110, 120 and 130 on the display of the electronic device.

The instructions executed by the processor also may enable a person to interact with the electronic device for modifying the view of the GUI that is presented on the display and for performing various operations using the visual representations of the users that are shown. In some implementations, the operator of the electronic device may interact with the electronic device using a keyboard, a mouse, and/or a trackball. Additionally or alternatively, the display may be implemented as a proximity-sensitive display (for example, a touchscreen) such that the operator may interact with the electronic device by gesturing on (or within a vicinity of) the surface of the display using a suitable input mechanism, such as touching or tapping with a finger or stylus.

The visual representations of the users in the views 110, 120 and 130 may be based on information that is locally present in the electronic device. For example, the users may be family, friends or other acquaintances of the operator of the electronic device, and information associated with the users may be present in a list of contacts, such as a software address book application, that is stored in the storage memory of the electronic device. The information may include photographs of the users, versions of which may be shown in the visual representations.

Alternatively, the visual representations of the users in the views 110, 120 and 130 may be based on information that is stored by a remote server. For example, the users may be connected to the operator of the electronic device in a social networking platform, and the visual representations of the users may be drawn from a server associated with the social networking platform. The electronic device may establish a communication channel with the server and obtain information about the users, including photographs of or otherwise associated with the users, for example, using suitable application programming interfaces (APIs) provided by the social networking platform.

The views 110, 120 and 130 may be presented on the display of the electronic device to allow the operator of the electronic device to select one or more of the users (for example, as recipients of an electronic message) by interacting with the visual representations that correspond to the users to be selected. In some implementations, the GUI may be presented on the electronic device to enable the operator to select one or more users to whom to send an invitation to an event.

The display of the electronic device may have limited dimensions such that only a portion of the collection of users can be shown on the display at a time. As illustrated in FIGS. 1A-1C, the subset 112 of visual representations of users shown in view 110 is different from the subset 122 of visual representations of users shown in view 120, which is different from the subset 132 of visual representations of users shown in view 130. For example, the subset 112 of the visual representations of users shown in view 110 includes visual representations of users 112a, 112b and 112c, which are not shown in the subset 122 of visual representations of users shown in view 120 or the subset 132 of visual representations of users shown in view 130. The subset 122 of visual representations of users shown in view 120 and the subset 132 of visual representations of users shown in view 130 both include the visual representation of user 122a, which is absent from the subset 112 of visual representations of users shown in view 110. The subset 122 of visual representations of users shown in view 120 also includes the visual representation of user 112d, which is not shown in the subset 132 of visual representations of users shown in view 130.

As illustrated in FIGS. 1A-1C, the views 110, 120 and 130 of the GUI suggest that, at their current scale, visual representations of all of the users within the collection of users cannot be displayed within the boundaries of the scrollable selection panel concurrently. For example, each of the views 110, 120, and 130 of the GUI shows portions of visual representations that have been cut off, which may imply to the operator of the electronic device that there are more visual representations than can be fully shown at one time in the scrollable selection panel.

The operator can cause the scrollable selection panel to display different subsets of the visual representations by scrolling the scrollable selection panel up and down. For example, for a touchscreen display, the operator may use a finger to perform a swiping or flicking gesture (for example, up or down) on the area of the display corresponding to the scrollable selection panel, which causes the electronic device to scroll the scrollable selection panel in the direction of movement of the finger.

Depending on the operator interaction, the electronic device may change the subset of visual representations of users shown in the scrollable selection panel. Some visual representations of users that were previously shown only in part may be caused to be shown in full based on the scrolling of the scrollable selection panel performed in response to the input by the operator of the electronic device. For example, as illustrated in FIG. 1A, only a portion of the visual representation of user 112d is shown in view 110. However, as illustrated in FIG. 1B, when the scrollable selection panel is scrolled in an upward direction relative to FIG. 1A, the full visual representation of user 112d comes into view as shown in view 120. Furthermore, visual representations of users that previously were not shown at all now may be shown based on the scrolling of the scrollable selection panel performed in response to the input by the operator of the electronic device. For example, the operator may cause the electronic device to scroll the scrollable selection panel further upward to display additional visual representations of users that previously were not shown at all. As illustrated in FIGS. 1A-1C, when the scrollable selection panel is scrolled further in an upward direction relative to FIG. 1A, visual representations of users that were not shown at all in view 110 may be shown in view 120 and/or view 130, including, for example, the visual representation of user 122a.

The views 110, 120 and 130 show the visual representations of the users arranged in a grid pattern. Each visual representation includes an image corresponding to the represented user (for example, a photograph of or otherwise associated with the represented user) along with some other identifying information presented below the image, such as, for example, the name of the represented user. In cases where images corresponding to one or more of the represented users are not available, generic images, such as, for example, outlines of human heads, may be displayed in place of images corresponding to the represented users.

The visual representations of users may be shown in arrangements other than a grid. For example, the visual representations of the users may be as arranged in a list pattern. For example, referring to FIGS. 1A-1C, the operator may change the arrangement of the visual representations from the grid pattern to a list pattern by selecting icon 116. For a touchscreen display, the operator may select the icon 116 by touching or tapping on an area of the display that corresponds to the icon 116.

FIGS. 2A and 2B illustrate two different views 210 and 220 respectively of an example of a GUI showing two different subsets of a collection of items (for example, users) arranged in a list pattern. The GUI may be same as the GUI illustrated in FIGS. 1A-1C.

Each view 210 and 220 includes a header panel 214 that is fixed across the different views and that includes a selectable icon 216. In addition, each of the views 210 and 220 includes a scrollable selection panel that displays respective subsets 212 and 222 of visual representations of users belonging to the collection of users, including, for example, users 212a, 212b and 222a. Each visual representation includes an image associated with the corresponding user and additional identifying information. For example, the visual representation of user 212a includes an image 212a(i) associated with user 212a and a name 212a(ii) for user 212a. In cases where images corresponding to one or more of the represented users are not available, generic images, such as, for example, outlines of human heads, may be displayed in place of images corresponding to the represented users.

As illustrated in FIGS. 2A-2B, the views 210 and 220 of the GUI also suggest that visual representations of all of the users of the collection of users are not displayed within the area available for display of the scrollable selection panel concurrently. For example, each of the views 210 and 220 shows a visual representation of a user that has been cut off, such as, for example, the visual representation of user 222a shown in view 220, which imply to the operator that there are more visual representations of users than can be fully shown at one time in the scrollable selection panel. The operator can cause the scrollable selection panel to display additional visual representations of users by scrolling the scrollable selection panel up or down. Depending on the operator interaction, the subset of visual representations shown in the scrollable selection panel may change, for example, from the subset 212 of visual representations shown in view 210 to the subset 222 of visual representations shown in view 220.

When the operator switches the arrangement of the visual representations of users from the grid pattern to the list pattern, the visual representations of users that are shown in the view of the scrollable selection panel in the list pattern may be same as (or overlap with) the visual representations that were shown in the view of the scrollable selection panel in the grid pattern at the time the operator performed the switch. In some implementations, the subset of visual representations of users shown in the view of the scrollable selection panel in the grid pattern may be larger than the subset of visual representations of users that is shown in the view of scrollable selection panel in the list pattern. In such implementations, the view of the scrollable selection panel in the list pattern may show some of the visual representations that are displayed in the view of the scrollable selection panel in the grid pattern at the time the operator performed the switch. For example, the view of the scrollable selection panel in the list pattern may show the first N (where N is a positive integer) visual representations of users that are shown in the view of the scrollable selection panel in the grid pattern at the time the operator performed the switch, where the view of the scrollable selection panel in the grid pattern displays a number of visual representations of users that is greater than N.

When the visual representations of the users are displayed in the list pattern, the operator may change to displaying the visual representations of the users in the grid pattern by selecting the icon 216, in a manner similar to that described above in connection with icon 116. Therefore, the operator may cause the GUI to toggle back and forth between displaying the visual representations of the users in the grid pattern and the list pattern by selecting the icon 116 when the visual representations of the users are displayed in the grid pattern and by selecting the icon 216 when the visual representations of the users are displayed in the list pattern.

The operator can select one or more users while GUI is displaying the visual representations of the users in either the grid pattern or in the list pattern. For example, the operator can select a user by selecting the visual representation associated with the user while the visual representation is shown in the view of the scrollable selection panel. For a touchscreen display, the operator can select a visual representation by touching or tapping the area of the display corresponding to the desired visual representation.

FIGS. 3A-3D illustrate four different views 310, 320, 330 and 340, respectively, of an example of a GUI showing the selection of users from a collection of users. The GUI may be the same as the GUI shown in FIGS. 1A-1C and/or the GUI shown in FIGS. 2A-2B and the GUI may be displayed on the same electronic device that displays the GUI shown in FIGS. 1A-1C and/or the GUI shown in FIGS. 2A-2B. As illustrated in FIGS. 3A-3C, each of the views 310, 320 and 330 includes a header panel 314 that is fixed across the three views and that includes a selectable icon 316. Each of the views 310, 320 and 330 also includes a scrollable selection panel showing a respective subset 312, 322 and 312 of visual representations of users belonging to the collection of users arranged in a grid pattern, including, for example, users 312a, 312b, 312c and 312d in subset 312 and users 322a, 322b and 322c in subset 322. The views 310 and 330 show the same subset 312 of the visual representations of users. In addition, each of the views 310, 320 and 330 includes a horizontal panel 318 that, as described in greater detail below, includes images corresponding to visual representations of users that currently are selected. Horizontal panel 318 also includes a tile 319, which also will be described in greater detail below. As illustrated in FIG. 3D, view 340 includes a header panel 344 with a selectable icon 346. In addition, view 340 includes a scrollable selection panel showing a subset 342 of visual representations of users belonging to the collection of users arranged in a list pattern, including, for example, user 342a. The view 340 also includes the horizontal panel 318. The horizontal panel 318 also may be referred to as a container element.

Referring to FIGS. 3A-3C, responsive to selection of a visual representation of a user by the operator, the electronic device on which the GUI is displayed causes the selected visual representation of the user to be emphasized in a suitable manner to indicate that the visual representation of the user has been selected, for example, by placing a highlight box around the image associated with the represented user, or overlaying a small checkmark on the image associated with the represented user, or both. In addition, the electronic device on which the GUI is displayed causes copies of the images associated with the selected visual representations to be added to the horizontal panel 318.

For example, as illustrated in FIG. 3A, responsive to operator selection of visual representations 312a, 312b and 312c, the images associated with the users represented by visual representations 312a, 312b and 312c are highlighted, and a checkmark is overlaid on the corner of each image. The highlighting and the checkmark applied to the selected visual representations 312a, 312b, and 312c distinguish the selected visual representations from the unselected visual representations, such as, for example, visual representation 312d. In addition to applying the highlighting and the checkmark to the selected visual representations 312a, 312b, and 312c, copies 318a, 318b and 318c of the images associated with the users represented by the selected visual representations 312a, 312b and 312c, respectively, are included in the horizontal panel 318.

In some implementations, the horizontal panel 318 may be displayed when one or more visual representations of users currently are selected; otherwise, the horizontal panel may not be displayed. For example, the view 110 of the GUI illustrated in FIG. 1A shows the same subset 112 of visual representations of users as the view 310 of the GUI illustrated in FIG. 3A. However, in the view 110 of the GUI illustrated in FIG. 1A, no visual representations of users have been selected and, consequently, the horizontal panel is not displayed. In some implementations, the selection of a visual representation of a user, when no other visual representations currently are selected, may trigger the display of the horizontal panel 318.

As illustrated in FIGS. 3A-3C, when the horizontal panel 318 is displayed, it may be overlaid on the scrollable selection panel. In some implementations, the horizontal panel 318 may be displayed overlaying the bottom of the scrollable selection panel, as illustrated in FIGS. 3A-3C. In other implementations, the horizontal panel 318 may be displayed in a different position, such as, for example, overlaying the top of the scrollable selection panel (for example, adjacent to the header panel 314). Alternatively, the horizontal panel 318 may be displayed at the top of the GUI, above the header panel 314, or the horizontal panel 318 may be displayed overlaying the header panel 314 (for example, occluding the header panel 314 in part or in full). In some other implementations, the horizontal panel 318 may be replaced by a vertical panel that is displayed overlaying a section of the scrollable selection panel (for example, along the left border of the scrollable selection panel or along the right border of the scrollable selection panel).

Depending on the number of users selected, the images included in the horizontal panel 318 may not occupy the entire available area of the horizontal panel 318 such that some area of the horizontal panel 318 may remain empty. For example, the empty area of the horizontal panel 318 is shown as a blank area 318d. As more users are selected, the blank area 318d may be replaced by copies of the images associated with the visual representations of the selected users. For example, referring to FIG. 3B, responsive to operator selection of the additional visual representations of users 322a, 322b and 322c, copies of the images 328a, 328b, and 328c associated with the users corresponding to visual representations 322a, 322b, and 322c are added to the horizontal panel 318 in addition to the copies of the images 318a, 318b, and 318c that were previously included in the horizontal panel 318. Therefore, the empty area 318d of the horizontal panel 318 shown in FIG. 3A is replaced by images associated with currently selected users.

Even when the subset of visual representations shown in the scrollable selection panel changes due to the operator scrolling the scrollable selection panel up or down, the display of the horizontal panel 318 is persisted. For example, when the operator changes the view of the GUI from the view 310 illustrated in FIG. 3A to the view 320 illustrated in FIG. 3B by scrolling the scrollable display panel such that the subset of visual representations shown on the scrollable selection panel changes from the subset of visual representations of users 312 to the subset of visual representations of users 322, the display of the horizontal panel 318 is persisted in the view 320 of the GUI. The horizontal panel 318 illustrated in FIG. 3B is same as the horizontal panel 318 illustrated in FIG. 3A, except that the horizontal panel 318 illustrated in FIG. 3B includes more images associated with selected users since the operator has selected more visual representations of users from the subset 322 of visual representations of users shown in the view 320 illustrated in FIG. 3B. In this manner, it may be easy for the operator to identify quickly which users the operator has already selected even if visual representations for the selected users are not displayed in the current view of the scrollable selection panel. For example, the horizontal panel 318 in the view 320 of the GUI illustrated in FIG. 3B shows an image 328d associated with a currently selected user. However, the corresponding visual representation of the user is not included in the subset 322 of visual representations of users displayed on the scrollable selection panel in the view 320.

In some implementations, as users are selected from the scrollable selection panel, their associated images are added to the horizontal panel 318 from the right to the left in the order that the users are selected, such that the image corresponding to the most recently selected user appears on the far left of the images included the horizontal panel 318. For example, referring to FIG. 3B, the operator may select visual representations in the sequence 322a, followed by 322b, followed by 322c. Therefore, image 328a corresponding to visual representation 322a appears to the right of the image 328b corresponding to visual representation 322b in the horizontal panel 318. Similarly, image 328b appears to the right of the thumbnail 328c corresponding to visual representation 322c in the horizontal panel 318. Visual representation 322c is the most recently selected visual representation, and, hence, the image 328c corresponding to visual representation 322c is the leftmost image in the horizontal panel 318. However, in other implementations, the images may be added to the horizontal panel 318 from left to the right as users are selected from the scrollable selection panel, or the images may be added in some other suitable order.

In some implementations, the tile 319 in the horizontal panel 318 displays a count of the number of users that currently are selected. For example, in the view 310 of the GUI illustrated in FIG. 3A, three users currently are selected, and the tile 319 displays the digit '3'. Five more users are selected at the time the view 320 of the GUI illustrated in FIG. 3B is shown, bringing the total count of selected users to eight, which is indicated by the tile 319 displaying the digit '8'.

When the number of images corresponding to selected users exceeds the available display area for the horizontal panel 318, a subset of the images corresponding to the selected users may be shown in the horizontal panel 318. For example, in the view 320 of the GUI illustrated in FIG. 3B, the horizontal panel 318 shows five images, even though the tile 319 indicates that eight users currently are selected. The operator may view the images corresponding to selected users that are not displayed currently (for example, images included within the horizontal panel 318 that are hidden from the present view), by scrolling the horizontal panel 318 left and right. For a touchscreen display, the operator can scroll the horizontal panel 318 left or right by touching, with a finger or stylus, an area of the display corresponding to the horizontal panel 318 and flicking or swiping the finger or stylus left or right. For example, images 318b and 318c, which are shown in the horizontal panel 318 in the view 310 of the GUI illustrated in FIG. 3A, are not shown in the horizontal panel 318 in the view 320 of the GUI illustrated in FIG. 3B since more users have been selected since the selection of the visual representations 312b and 312c that correspond to the images 318b and 318c respectively. The operator may again see the images 318b and 318c by scrolling the horizontal panel 318 from right to left. As illustrated in the view 330 of the GUI illustrated in FIG. 3C, as the operator scrolls the horizontal panel 318 from right to left, the images 318c and 318b are shown again in horizontal panel 318.

In some implementations, the available display area for the horizontal panel 318 may be fixed. Consequently, as the operator scrolls the horizontal panel 318, some images that were previously visible within the horizontal panel 318 may become hidden from view. For example, the images 328c and 328b, which were the leftmost images displayed in the horizontal panel 318 in the view 320 of the GUI illustrated in FIG. 3B, are no longer seen in the horizontal panel 318 when the operator scrolls the horizontal panel 318 from right to left as seen in the view 330 of the GUI illustrated in FIG. 3C. Instead, image 328a, which was shown in the middle of the horizontal panel 318 in the view 320 of the GUI illustrated in FIG. 3B, appears as the leftmost displayed image in the horizontal panel 318 in the view 330 of the GUI illustrated in FIG. 3C, while image 328d, which was the rightmost image displayed in the horizontal panel 318 in the view 320 of the GUI illustrated in FIG. 3B, is shown in the middle of the horizontal panel 318 in the view 330 of the GUI illustrated in FIG. 3C. In order to display the images 328b and 328c again, the operator can scroll the horizontal panel 318 from the left to the right, such that images 318b and 318c are again hidden from view, while images 328b and 328c are shown, similar to the view of the horizontal panel 318 in the view 320 of the GUI illustrated in FIG. 3B.

In some implementations, the movement of the scrollable selection panel and the horizontal panel 318 are independent of each other. As such, the operator can scroll the scrollable selection panel up or down to display a subset of visual representations of users that do not include any visual representations of users with corresponding images shown in the horizontal panel 318. Conversely, the operator can scroll the horizontal panel left or right to display images that do not correspond to any of the visual representations of users shown at the same time in the scrollable selection panel.

In other implementations, the movements of the scrollable selection panel and the horizontal panel 318 are tied to each other. In such implementations, as the operator scrolls the scrollable selection panel up or down to change the displayed subset of visual representations of users, the horizontal panel 318 also may be scrolled (for example, left or right) to show images that correspond to selected visual representations of users shown in the scrollable selection panel. Conversely, as the operator scrolls the horizontal panel 318 left or right to display previously hidden images, the scrollable selection panel may be scrolled automatically (for example, up or down) to show selected visual representations that correspond to the images presently shown in the horizontal panel 318. The rate at which the scrollable selection panel may automatically scroll up or down, or the rate at which the horizontal panel may automatically scroll left or right, may keep pace with the rate at which the user scrolls the other panel.

The views 310, 320 and 330 of the GUI illustrated in FIGS. 3A-3C show the visual representations of the users arranged in a grid pattern. The operator can opt to arrange the visual representations of the users in a list pattern by selecting the icon 316. For example, responsive to operator selection of the icon 316 from the view 320 of the GUI illustrated in FIG. 3B, the electronic device on which the GUI is displayed may cause the GUI to transition to the view 340 illustrated in FIG. 3D, which shows the subset 342 of visual representations of users arranged in a list pattern. When in the view 340, the operator can switch back to the view 320 by selecting the icon 346.

In some implementations, when the visual representations of users are arranged in the list pattern, currently selected users are indicated by a checkmark placed next to the image included in the row entry corresponding to the selected user. For example, as illustrated in FIG. 3D, the visual representation of user 342a currently is selected, which is indicated by the checkmark 344 that is included in the row entry corresponding to the visual representation of user 342a.

When the operator switches to the view 340 of the GUI illustrated in FIG. 3D from the view 320 of the GUI illustrated in FIG. 3B, the display of the horizontal panel 318 is persisted in the view 340 of the GUI, thereby allowing the operator to continue to see the users who have been selected. In addition, the operator can make further selections from the subset 342 of visual representations of users, at which time the horizontal panel 318 shown in the view 340 of the GUI illustrated in FIG. 3D will be updated to display images corresponding to the newly-selected users.

The operator may deselect users who have been previously selected. In some implementations, the operator may deselect a selected user by selecting the currently selected visual representation corresponding to the user to be deselected. For example, FIGS. 4A and 4B illustrate two different views 410 and 420, respectively, of an example of a GUI showing the de-selection of a user. The GUI may be the same as the GUI shown in FIGS. 1A-1C, the GUI shown in FIGS. 2A-2B, and/or the GUI shown in FIGS. 3A-3D and the GUI may be displayed on the same electronic device that displays the GUI shown in FIGS. 1A-1C, the GUI shown in FIGS. 2A-2B, and/or the GUI shown in FIGS. 3A-3d.

The view 410 of the GUI illustrated in FIG. 4A includes a subset 412 of visual representations of users belonging to the collection of users, including, for example, a visual representation 412a of a user who has been selected by the operator. In addition, the view 410 of the GUI illustrated in FIG. 4A includes a horizontal panel 418 that shows images corresponding to currently selected users, such as images 418a and 418b, and a tile 419. The view 420 of the GUI illustrated in FIG. 4B shows the same subset of visual representations 412 of users belonging to the collection of users as the view 410 of the GUI illustrated in FIG. 4A, but the visual representation of user 412a has been deselected by the operator. The view 420 of the GUI illustrated in FIG. 4B also shows a the horizontal panel 418 that images corresponding to selected users, such as images 418b and 418c but, notably, not image 418a, and a tile 419.

In the view 410 of the GUI illustrated in FIG. 4A, the visual representation of user 412a is selected, such that a copy of the image associated with the selected user is included in the horizontal panel 418. In some implementations, the operator may deselect the user represented by visual representation 412a by selecting the highlighted visual representation 412a of the user in the scrollable selection panel of the view 410 of the GUI illustrated in FIG. 4A. For example, in a touchscreen display, the operator can touch the area of the display corresponding to the highlighted visual representation 412a.

When the operator selects the highlighted visual representation of the user 412a, the user represented by the visual representation 412a is deselected, and the view 410 of the GUI illustrated in FIG. 4A transitions to the view 420 of the GUI illustrated in FIG. 4B, in which the visual representation of user 412a is no longer highlighted. In addition, as further illustrated in FIG. 4B, the copy of the image 418a associated with the user represented by visual representation 412a is automatically removed from the horizontal panel 418. Consequently, the images corresponding to currently selected users in the horizontal panel 418 have moved one place to the left, such that image 418c, which was hidden from view in the horizontal panel 418 in the view 410 of the GUI illustrated in FIG. 4A, now appears as the rightmost image in the horizontal panel 418 in the view 420 of the GUI illustrated in FIG. 4B. The total count of selected visual representations drops by one when visual representation 412a is deselected. Consequently, while the tile 419 shown in the view 410 of the GUI illustrated in FIG. 4A shows the total count of selected users as 8, the tile 419 shown in the view 420 of the GUI illustrated in FIG. 4B shows the total count of selected users as 7.

A selected user may be deselected in other manners, apart from the one described above. For example, in some implementations, the GUI may enable the operator to deselect a user by dragging the image corresponding to the user to be deselected that is displayed in the horizontal panel 418 out of the horizontal panel 418. In this context, "dragging" an image may refer to selecting an image and, while the image is selected, moving the image outside of the boundaries of the horizontal panel 418. For example, the operator may drag the thumbnail 418a from the horizontal panel 418 to the area of the scrollable selection panel, in order to deselect the user represented by visual representation 412a.

In some implementations, the GUI may enable the operator to change the view of the GUI to display visual representations of only the currently selected users instead of visual representations of all of the users belonging to the collection. In such implementations, this may be performed, for example, by selecting the tile that is displayed in the horizontal panel (for example, tile 419 displayed in the horizontal panel 418 of the GUI illustrated in FIGS. 4A-4B).

For example, FIGS. 5A and 5B illustrate two different views 510 and 520, respectively, of an example of a GUI showing visual representations of currently selected users from among a collection of users. The views 510 and 520 may be displayed on the same electronic device that shows the views 310, 320, 330, 340 or the views 410 and 420. The GUI may be same as the GUI shown in the views 310, 320, 330, 340 or the views 410 and 420. The GUI may be the same as the GUI shown in FIGS. 1A-1C, the GUI shown in FIGS. 2A-2B, the GUI shown in FIGS. 3A-3D, and/or the GUI shown in FIGS. 4A-4B and the GUI may be displayed on the same electronic device that displays the GUI shown in FIGS. 1A-1C, the GUI shown in FIGS. 2A-2B, the GUI shown in FIGS. 3A-3D, and/or the GUI shown in FIGS. 4A-4B.

As illustrated in FIGS. 5A-5B, each of the views 510 and 520 includes a header panel 514 with a tile 519. In addition, each of the views 510 and 520 shows a group 512 of visual representations of selected users, including, for example, visual representations of selected users 512a and 512b. Each visual representation of a selected user also is associated with a 'delete' icon 516.

The view 510 of the GUI illustrated in FIG. 5A displays the visual representations of the selected users in a grid pattern. In some implementations, the visual representations of the selected users are shown in a grid pattern as illustrated in FIG. 5A if the view of the group of selected users is invoked from a view of the GUI that displays visual representations of users available for selection that arranges the visual representations of the users in the grid pattern. For example, the view 510 of the GUI illustrated in FIG. 5A may be invoked by selecting the tile 419 in the view 420 of the GUI illustrated in FIG. 4B, such that the visual representations 512a and 512b of FIG. 5A correspond to the visual representations 418b and 418c, respectively.

The view 520 of the GUI illustrated in FIG. 5B displays the visual representations of the selected users in a list pattern. In some implementations, the visual representations of the selected users are shown in a list pattern as illustrated in FIG. 5B if the view of the group of selected users is invoked from a view of the GUI that displays visual representations of users available for selection that arranges the visual representations of the users in the list pattern.

A selected user may be deselected from the views 510 and 520 of the GUI illustrated in FIGS. 5A and 5B, respectively, by selecting the delete icon 516 that is associated with the corresponding visual representation of the user. For example, the user 512a may be deselected from the view 510 of the GUI illustrated in FIG. 5A by selecting the delete icon 516 that is overlaid on the visual representation of the user 512a. Similarly, the user 512a may be deselected from the view 520 of the GUI illustrated in FIG. 5B by selecting the delete icon 516 that is shown to the left of the image included in the row entry corresponding to the user 512a. When a user is deselected, the visual representation of the user is removed from the view.

The tile 519 shows a count of the total number of currently selected users. In addition, the tile 519 may enable the operator to switch back to a view of the GUI showing the scrollable selection panel and the horizontal panel by selecting the tile 519. In some implementations, when the visual representations of the set of selected users are shown in the grid pattern, as in the view 510 of the GUI illustrated in FIG. 5A, selection of the tile 519 causes the view to transition to a view that shows visual representations of users available for selection arranged in a grid pattern in the scrollable selection panel. Similarly, in such implementations, when the visual representations of the set of selected users are shown in the list pattern, as in the view 520 of the GUI illustrated in FIG. 5B, selection of the tile 519 causes the view to transition to a view that shows visual representations of users available for selection arranged in a list pattern in the scrollable selection panel.

In some cases, the number of selected users may be such that the area of the display available for showing visual representations of the selected users may not be sufficient to accommodate simultaneously the visual representations of all the selected users. Consequently, some of the visual representations of the selected users may be hidden from view. In such cases, the operator may see the visual representations of the selected users that are hidden from view by scrolling the area of the display available for showing visual representations of the selected users.

Figure 6:
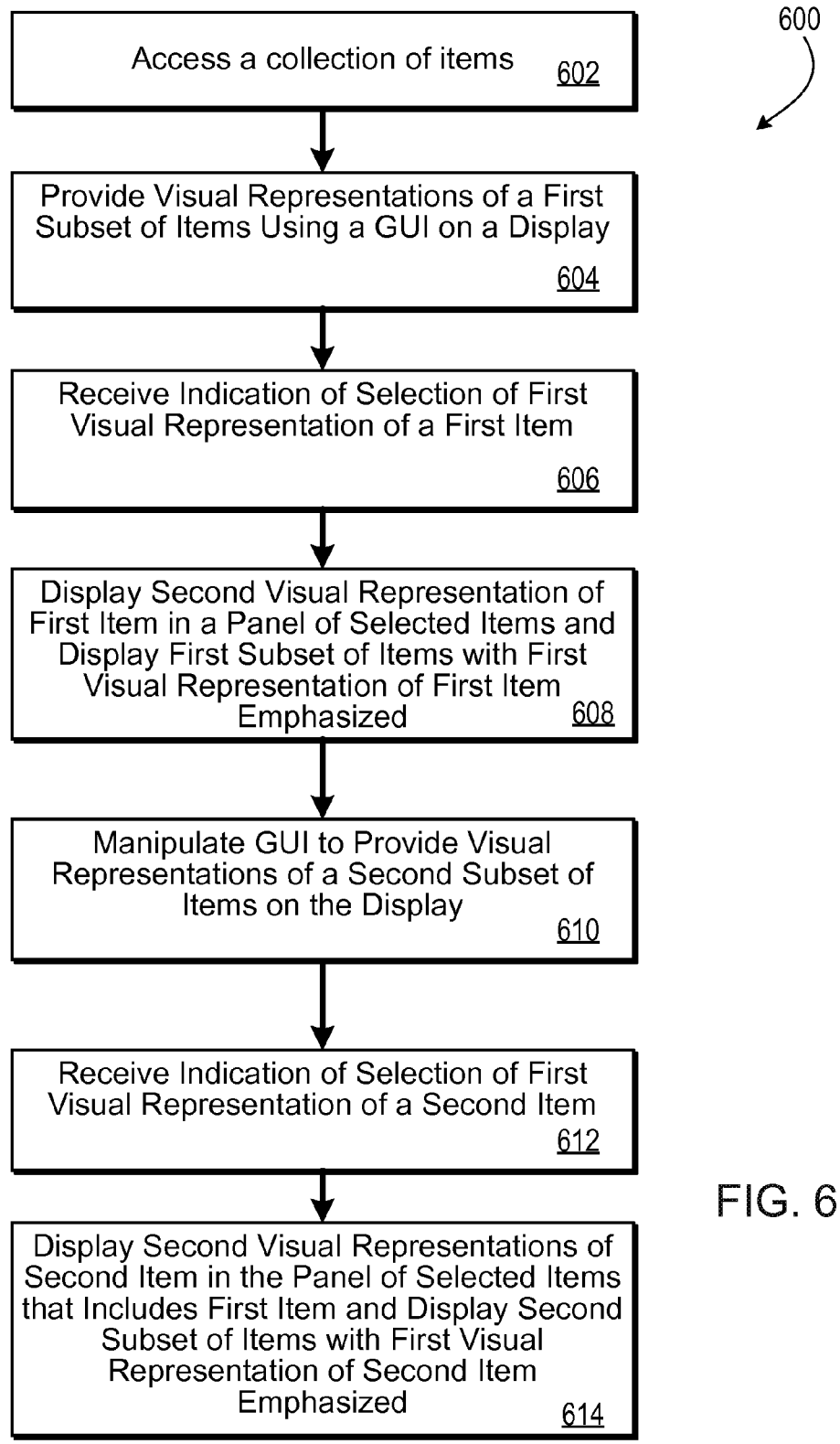
FIG. 6 illustrates an example of a process that may be used to display a collection of items available for selection along with a display of selected items.

FIG. 6 illustrates an example of a process 600 that may be used to display, on a display device associated with an electronic device, a collection of items available for selection along with a display of selected items. The process 600 may be performed, for example, by a processor included in the electronic device. The processor may perform the process 600 by executing instructions stored in storage memory coupled to the electronic device. Execution of the instructions may result in the display of a GUI including views similar to one or more of those described above. Accordingly, the process 600 is described below with respect to the views 110, 210, 310, and 320 of the GUI illustrated in FIGS. 1A, 2A, 3A and 3B, respectively.

A collection of items is accessed (602). For example, an operator of the electronic device may wish to send an invitation to a group of users. In order to select the users to whom to send the invitation, the operator may invoke an application on the electronic device that is associated with instructions for selecting users to whom to send an invitation from among a collection of users. Based on the operator's invocation, the processor on the electronic device may execute the instructions to access the collection of users, for example, from a set of contacts stored locally on the electronic device. Alternatively, the instructions may obtain the collection of users from a remote server (for example, a server associated with an event management application and/or a server associated with a social networking platform).

Visual representations of a first subset of items are provided using a GUI on a display (604). For example, upon obtaining the collection of users, the instructions may be executed to display a GUI on the electronic device with a view similar to the view 110 of the GUI illustrated in FIG. 1A or the view 210 of the GUI illustrated in FIG. 2A in which visual representations of subsets of the collection of users are displayed in a scrollable selection panel of the GUI.

An indication of a selection of a first visual representation of a first item is received (606). For example, in the view 110 of the GUI illustrated in FIG. 1A, the operator may select a user by selecting the visual representation corresponding to the user from the subset 112 of visual representations of users, such as, for example, the visual representation of user 112a.

In response, a second visual representation of the first item is displayed in a panel of selected items, and the first subset of items is displayed with the first visual representation of the first item emphasized (608). For example, when the operator selects the visual representation of user 112a from the view 110 of the GUI illustrated in FIG. 1A as described above as the first selection that is made, the GUI transitions to a view of the GUI, such as, for example, the view 310 of the GUI illustrated in FIG. 3A, where the horizontal panel 318 is displayed overlaying the scrollable selection panel. In addition, the image 318a, which is associated with the selected user, is added to the horizontal panel 318 to identify the selected user, and the visual representation of the selected user (for example, visual representation 312a in FIG. 3A, which is same as visual representation 112a in FIG. 1A), in the scrollable selection panel is visually distinguished from the other visual representations of users in the scrollable selection panel as another way of identifying the selected user.

The GUI is manipulated to provide visual representations of a second subset of items on the display (610). For example, the operator scrolls the scrollable selection panel of the GUI to transition the view 310 of the GUI illustrated in FIG. 3A displaying the subset 312 of visual representations of users to the view 320 of the GUI illustrated in FIG. 3B displaying the subset 322 of visual representations of users.

An indication of a selection of a first visual representation of a second item is received (612). For example, in the view 320 of the GUI illustrated in FIG. 3B, the operator selects a second user by selecting the visual representation of user 322c.

In response, a second visual representation of the second item is displayed in the panel of selected items that includes the second visualization of the first item, and the second subset of items is displayed with the first visual representation of the second item emphasized (612). For example, when the operator selects the visual representation of user 322c from the view 320 of the GUI illustrated in FIG. 3B, the horizontal panel 318 is updated to display the image 328c, which is associated with the user represented by the visual representation 322c. In addition, the visual representation of the user 322c in the scrollable selection panel is visually distinguished from other visual representations of users in the scrollable selection panel as an indication that the associated user has been selected. Although the horizontal panel 318 in the view 320 of the GUI illustrated in FIG. 3B is not shown as displaying image 318a corresponding to the previously selected user represented by visual representation 312a, the horizontal panel 318 does, in fact, include the image 318a. It is just that the image 318a is hidden from the view of the display of the horizontal panel 318 due to the number of other images displayed in the horizontal panel 318. To view the image 318a, the operator may scroll the horizontal panel 318 from the right to the left.

Figure 7:
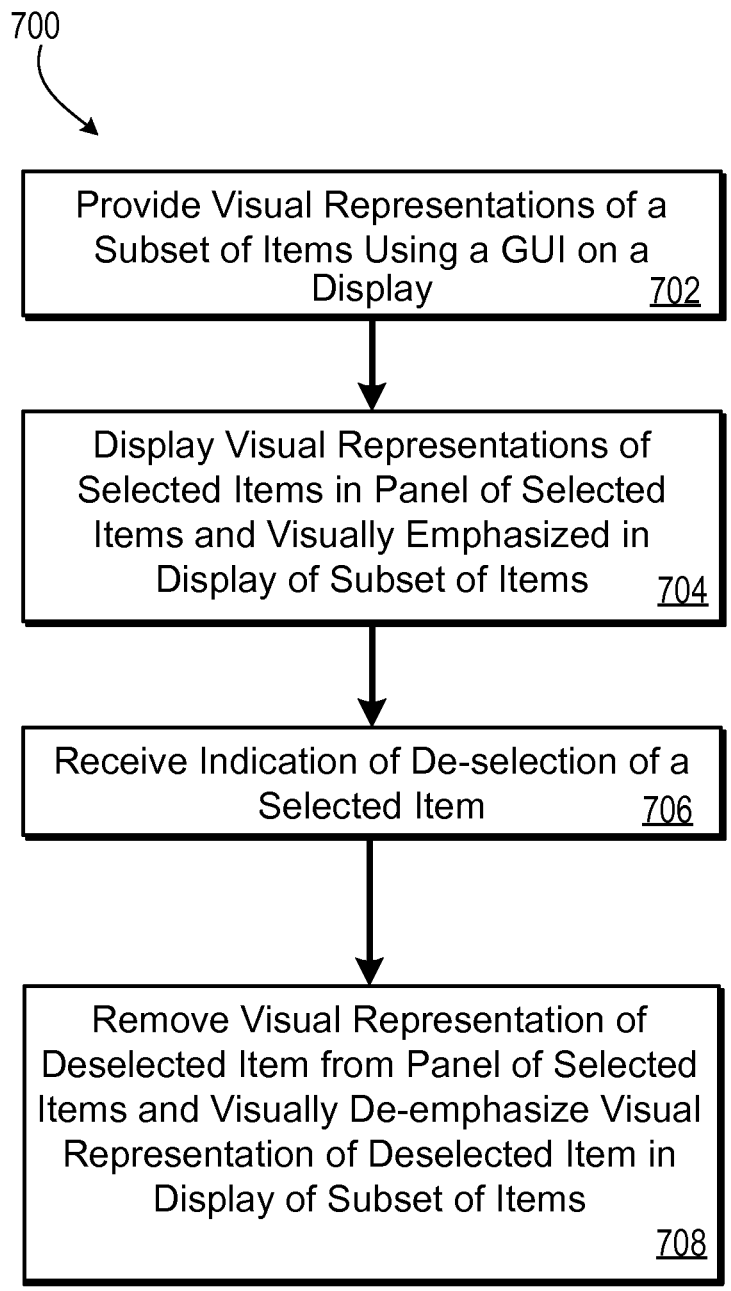
FIG. 7 illustrates an example of a process that may be used to display a collection of selected and unselected items and enable de-selection of a selected item.

FIG. 7 illustrates an example of a process 700 that may be used to display, on a display device associated with an electronic device, a collection of selected and unselected items and enable de-selection of a selected item. The process 700 may be performed, for example, by a processor included in the electronic device. The processor may perform the process 700 by executing instructions stored in storage memory coupled to the electronic device. Execution of the instructions may result in the display of a GUI including views similar to one or more of those described above.

Accordingly, the process 700 is described below with respect to the views 410 and 420 of the GUI illustrated in FIGS. 4A and 4B.

Visual representations of a subset of items are provided using a GUI on a display (702). For example, a GUI may be presented on the display of the electronic device showing a view similar to the view 410 of the GUI illustrated in FIG. 4A, which includes a subset 412 of visual representations of users belonging to a collection of users.

Visual representations of currently selected items are displayed in a panel of selected items and visually emphasized in the display of the subset of items (704). For example, as illustrated in the view 410 of the GUI illustrated in FIG. 4A, the user corresponding to the visual representation 412a currently is selected. Accordingly, the image 418a, which is associated with the user represented by visual representation 412a, is shown in the horizontal panel 418 to identify the corresponding user as being currently selected. In addition, the visual representation of the user 412a in the scrollable panel is emphasized by highlighting the borders of the image included in the visual representation of the user 412a and also by overlaying a checkmark on the visual representation of the user 412a.

An indication of de-selection of a selected item is received (706). For example, the operator may choose to remove the user corresponding to the visual representation 412a from the group of selected users.

In response, the visual representation of the deselected item is removed from the panel of selected items, and the visual representation of the deselected item is visually de-emphasized in the display of the visual representations of the subset of items (708). For example, as illustrated in the view 420 of the GUI illustrated in FIG. 4B, in response to the operator deselecting the user represented by visual representation 412a, instructions are executed by the electronic device to remove automatically the image 418a from the horizontal panel 418. In addition, the visual representation of the user 412a in the scrollable panel is de-emphasized by removing the highlighting and the checkmark from the visual representation of the user 412a.

Several applications are possible based on the subject matter described above. In some implementations, when a number of users are selected from among a collection of users as described above, the operator may perform a common action with respect to all of the selected users. For example, in some implementations, the operator may send an electronic communication to the selected users. In such implementations, the operator may compose a group message, such as, for example, an electronic invitation, an email, or a text message, which is sent to all of the selected users together. Alternatively, the operator may compose a common message to be sent to the selected users, and an underlying software application executing on the electronic device may send the message to each user in the group of selected users individually. Before sending such individual messages, the underlying software application may customize the message send to each individual user. In some implementations, the electronic communication may be an invitation to a videoconference, a teleconference, or any of a variety of other forms of collaboration sessions.

Although the techniques for selecting items from among a collection of items described above generally are described in the context of selecting users from among a group of users, the techniques described above are widely applicable and may be used to facilitate the selection of items of any kind from among a collection of items. For example, in some implementations, the techniques described above may be used to facilitate the selection of electronic files from among a collection of electronic files. In some such implementations, the items in the collection are files available for download from one or more remote servers, and a bulk download of the selected files may be performed from the remote server(s) where the files are stored. Additionally or alternatively, the techniques described above may be used to facilitate the selection of products to purchase from one or more e-commerce platforms (for example, on-line shopping websites). In such implementations, the techniques described above may enable a purchaser to select multiple products to be purchased in a single transaction from among a collection of products.

The features described can be implemented in digital electronic circuitry, in computer hardware, firmware, software, or in combinations of them. The apparatus can be implemented in a computer program product tangibly embodied in an information carrier, for example, in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touch-screen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A non-transitory computer-readable medium storing instructions executable by one or more computers that, upon execution, cause the one or more computers to perform operations comprising:

obtaining, at a computing device, data representing a plurality of items;

rendering, on a display of the computing device, a viewport, a portion of a first container element within the viewport, and a first portion of a second container element within the viewport, the first container element extending beyond a first boundary of the viewport in a first direction, and the second container element extending beyond a second boundary of the viewport in a second direction, wherein the first direction is perpendicular to the second direction;

rendering, in the portion of the first container element, selectable visual representations for a first subset of the plurality of items, wherein the first container element includes a first command interface that enables a user to manipulate the first container element along the first direction such that other portions of the first container element beyond the first boundary are rendered within the viewport, so as to display selectable visual representations for other subsets of the plurality of items;

receiving, at the computing device, a plurality of inputs from the user, each of the plurality of inputs selecting a visual representation of an item from the plurality of items rendered in the portion of the first container element;

responsive to receiving each input that selects a visual representation in the first container element, rendering, in the first portion of the second container element, another visual representation of the item corresponding to the selected visual representation, a presence of the other visual representation in the second container element indicating that the visual representation for the item in the first container element has been selected; and rendering, in a second portion of the second container element, a numeric quantity specifying a total number of visual representations that (i) have been selected in the first container element, and (ii) are included in the second container element, wherein at least one of the visual representations in the second container element is within a third portion of the second container element that is beyond the second boundary of the viewport, wherein the second container element includes a second command interface that enables a user to manipulate the second container element along the second direction such that the third portion of the second container element that is beyond the second boundary is moved within the viewport, so as to display the at least one of the visual representations in the second container element that is beyond the second boundary of the viewport, and wherein the manipulation of the first container element along the first direction includes scrolling the first container element in the first direction and the manipulation of the second container element along the second direction includes scrolling the second container element in the second direction perpendicular to the first direction.

2. The computer-readable medium of claim 1, wherein the visual representations of the items are photographs of the individuals that the visual representations represent.

3. The computer-readable medium of claim 1, wherein the plurality of items is one or more of: (I) a plurality of products available for purchase, and (II) a plurality of files available for download.

4. The computer-readable medium of claim 1, wherein:
a first dimension and a second dimension of the viewport are fixed; and
an area of the first container element is fixed.

5. The computer-readable medium of claim 1, wherein:
in a first mode of operation of the computing device, the portion of the first container element is rendered within the viewport and no second container element is rendered;
in a second mode of operation of the computing device, the portion of the first container element is rendered within the viewport and the first portion of the second container element and the second portion of the second container element are rendered to overlay the first container element within the viewport;
the first mode of operation is executed when visual representations in the portion of the first container element are not selected; and
the second mode operation is executed in response to selection of one or more visual representations in the portion of the first container element.

6. The computer-readable medium of claim 1, wherein the second container element is a scrollable list.

7. The computer-readable medium of claim 1, wherein the visual representations in the second container element are smaller in size than the visual representations in the first container element.

8. The computer-readable medium of claim 1, wherein the visual representations in the first container element comprise images and text, and wherein the visual representations in the second container element include images while excluding text.

9. The computer-readable medium of claim 1, wherein the visual representations in the first container element are displayed in a grid view, and wherein the first container element further comprises a third command interface that enables the user to cause the visual representations in the first container element to be rendered in a list view.

10. The computer-readable medium of claim 1, wherein:
the display is a touch-sensitive display, and receiving, at the computing device, a plurality of inputs from the user comprises receiving, at the computing device, a plurality of touches on the touch-sensitive display, each of the plurality of touches selecting a visual representation in the first container element.

11. The computer-readable medium of claim 1, wherein the display is a touch-sensitive display, and the operations further comprise:
receiving, at the touch-sensitive display of the computing device, a touch that identifies a previously-selected visual representation in the first container element; and
in response to receiving the touch, indicating that the previously-selected visual representation is no longer selected by:
removing, from the portion of the first container element, an indicator that indicated that the previously-selected visual representation was selected; and
removing, from the second container element, a visual representation corresponding to the previously-selected visual representation.

12. The computer-readable medium of claim 1, wherein the display is a touch-sensitive display, and the operations further comprise:
receiving, at the computing device, a drag gesture on the touch-sensitive display selecting, in the second container element, a visual representation of an item corresponding to a previously-selected visual representation in the first container element such that the previously-selected visual representation is deselected,
wherein the other visual representation of the item corresponding to the previously-selected visual representation is removed from the second container element.

13. The computer-readable medium of claim 1, wherein the selected visual representations in the first container element are:
selected without receiving a user input through the second container element; and
visually distinguished from non-selected visual representations in the first container element by overlaying selection indicators on the selected visual representations in the first container element.

14. A method comprising:
obtaining, at a computing device, data representing a plurality of items;
rendering, on a display of the computing device, a viewport, a portion of a first container element within the viewport, and a first portion of a second container element within the viewport, the first container element extending beyond a first boundary of the viewport in a first direction, and the second container element extending beyond a second boundary of the viewport in a second direction, wherein the first direction is perpendicular to the second direction;
rendering, in the portion of the first container element, selectable visual representations for a first subset of the plurality of items, wherein the first container element includes a first command interface that enables a user to manipulate the first container element along the first direction such that other portions of the first container element beyond the first boundary are rendered within the viewport, so as to display selectable visual representations for other subsets of the plurality of items;
receiving, at the computing device, a plurality of inputs from the user, each of the plurality of inputs selecting a visual representation of an item from the plurality of items rendered in the portion of the first container element;

responsive to receiving each input that selects a visual representation in the first container element, rendering, in the first portion of the second container element, another visual representation of the item corresponding to the selected visual representation, wherein a presence of the other visual representation in the second container element indicates that the visual representation for the item has been selected in the first container element, and wherein at least one of the visual representations in the second container element is located in a third portion of the second container element that is beyond the second boundary of the viewport;

rendering, in a second portion of the second container element, a numeric quantity specifying a total number of visual representations that (i) have been selected in the first container element, and (ii) are included in the second container element;

receiving, through the second container element, a manipulation input to manipulate the second container element along the second direction such that: (i) the second portion of the second container element remains in a fixed position in the second container element; and (ii) the third portion of the second container element that is beyond the second boundary is moved within the viewport; and responsive to receiving the manipulation input:

maintaining display of the second portion of the second container element at the fixed position in the second container element; and moving the at least one of the visual representations located beyond the second boundary of the viewport in the third portion of the second container element before reception of the manipulation input, to within the first portion of the second container element after reception of the manipulation input, wherein the manipulation of the first container element along the first direction includes scrolling the first container element in the first direction and the manipulation of the second container element along the second direction includes scrolling the second container element in the second direction perpendicular to the first direction.

15. A system comprising:

a processor;

instructions embedded in a non-transitory machine-readable medium for execution by the processor and, when executed, configured to cause the processor to perform operations comprising:

displaying a user interface on a touch-sensitive display of a computing device, the user interface comprising:

a first container element configured to scroll in a first direction, the first container element including a set of visual representations, and a second container element that includes: (i) a first portion configured to scroll in a second direction that is perpendicular to the first direction, and (ii) a second portion that remains displayed in a fixed position as the first portion is scrolled;

receiving, at the touch sensitive display, tap inputs that each select a visual representation in the set of visual representations;

for each of the selected visual representations in the first container element, displaying, in the first portion of the second container element, an additional visual representation in the second container element to indicate that the corresponding visual representation in the first container element is selected;

rendering, in the second portion of the second container element, a numeric quantity specifying a total number of visual representations that (i) have been selected in the first container element, and (ii) are included in the second container element;

detecting user selection of the second portion of the second container element; and in response to detecting the user selection of the second portion of the second container element, displaying, on the touch-sensitive display of the computing device, a third container element that replaces the first container element and the second container element, the third container element displaying the visual representations that were selected at the time the user interacted with the second portion of the second container element.

16. The computer-readable medium of claim 15, further comprising:

displaying a removal selection indicator for each of the displayed visual representations in the third container element; and in response to selection of a particular visual representation in the third container element or a removal selection indicator associated with the particular visual representation, removing the particular visual representation from the third container element.

17. The computer-readable medium of claim 15, wherein, for each of the displayed visual representations in the third container element, the removal selection indicator overlaps at least a portion of the displayed visual representation.

18. The computer-readable medium of claim 15, further comprising:

receiving, through a search interface in the third container element, a query;

determining that one or more visual representations in the third container element match the received query; and displaying a visual indicator to indicate that the one or more visual representations in the third container element match the received query.

* * * * *